United States Patent [19]

Lesartre

[11] Patent Number: 5,758,178
[45] Date of Patent: May 26, 1998

[54] MISS TRACKING SYSTEM AND METHOD

[75] Inventor: Gregg Lesartre, Fort Collins, Colo.

[73] Assignee: Hewlett-Packard Company, Palo Alto, Calif.

[21] Appl. No.: 609,338

[22] Filed: Mar. 1, 1996

[51] Int. Cl.$^6$ .................................................. G06F 12/02
[52] U.S. Cl. ..................... 395/800.23; 395/566; 711/141; 711/210
[58] Field of Search .......................... 395/800.23, 566; 711/126, 133, 141, 210

[56] References Cited

U.S. PATENT DOCUMENTS

| | | | |
|---|---|---|---|
| 5,555,392 | 9/1996 | Chaput et al. | 345/445 |
| 5,557,769 | 9/1996 | Bailey et al. | 395/473 |
| 5,636,364 | 6/1997 | Emma et al. | 395/467 |

OTHER PUBLICATIONS

Anderson et al. Two Techniques for Improving Performance on bush-based Multiprocessors, Jan. 1995.
Carlton Multiple-Bus, Scalable-Memory Multiprocessors Chapter 5, 1992.
Johson Superscalar Microprocessor Design Chapter 8, 1991.
Goodman et al. The Wisconsin Multicarbes A New Large-Scale Caehe-Coherent Multiprocessor, 1988.

*Primary Examiner*—Larry D. Donaghue

[57] ABSTRACT

A miss tracking system optimizes the bandwidth to a main memory that is associated with a processor that utilizes a data cache and that executes instructions out of order. The miss tracking system includes the processor, the main memory in communication with the processor, and a data cache (DCACHE) associated with the processor. The processor has a memory queue (MQUEUE) for receiving and executing instructions that are directed to memory accesses to the DCACHE or the main memory. The MQUEUE includes a plurality of instruction processing mechanisms for receiving and executing respective memory instructions out of order. Each instruction processing mechanism includes an instruction register for storing an instruction and an address reorder buffer slot (ARBSLOT) for storing the data address of the instruction execution results. Significantly, dependent-on-miss (DM) indicator logic in each ARBSLOT prevents a request from its respective ARBSLOT to the main memory for miss data that is absent from the DCACHE when another ARBSLOT has already requested from the main memory the miss data. This is accomplished with DM indicator logic and a status indicator associated with each DCACHE data line. The DM indicator logic includes a DM indicator for asserting and deasserting a signal DM to indicate respectively whether or not an instruction associated with its respective ARBSLOT currently depends upon miss data that has not yet been received. The status indicator indicates a miss pending status, which means that the corresponding DCACHE data line is both invalid and has already been requested from the main memory.

12 Claims, 4 Drawing Sheets

FIG. 4

MISS TRACKING SYSTEM AND METHOD

FIELD OF THE INVENTION

The present invention generally relates to computer processor architectures, and more particularly, to a miss tracking system and method for tracking memory requests resulting from cache misses in a processor that executes instructions out of order, so that redundant memory requests are eliminated and memory bandwidth is optimized.

BACKGROUND OF THE INVENTION

A computer processor (processing unit) generally comprises a control unit, which directs the operation of the system, and an arithmetic logic unit (ALU), which performs computational operations. The design of a processor involves the selection of a register set(s), communication passages between these registers, and a means of directing and controlling how these operate. Normally, a processor is directed by a program, which consists of a series of instructions that are kept in a main memory. Each instruction is a group of bits, usually one or more words in length, specifying an operation to be carried out by the processor. In general, the basic cycle of a processor comprises the following steps: (a) fetch an instruction from main memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as superscalar processors where two or more scaler operations are performed in parallel, the processor may be designed to perform instructions that are out of order, or in an order that is not consistent with that defined by the software driving the processor. In these systems, instructions are executed when they can be executed, as opposed to when they appear in the sequence defined by the program. Moreover, after execution of out of order instructions, the results are ultimately reordered to correspond with the instruction order, prior to passing the results back to the program.

A cache memory is often employed in association with a processor in a computer in order to optimize performance. A cache memory is a fast buffer located between the processor and the main memory of the computer. Data and instructions in current use in the processor are moved into the cache memory, thereby producing two benefits. First, the average access time for the processor's memory requests are reduced, increasing the processor's throughput. Second, the processor's utilization of the available memory bandwidth is thereby reduced, allowing other devices on the system bus to use the memory without interfering with the processor. A cache memory is thus used to speed up the flow of instructions and data into the processor from the main memory. This cache function is important because the main memory cycle time is typically slower than processor clocking rates.

When a processor accesses a data cache for a data line, the processor forwards an address to the cache. The cache parses a cache index from the address and uses it to select a storage location(s) that may contain the desired data line. The cache outputs a tag, which is a real page number (RPN) in some designs, corresponding with the location(s) and a status indicator, which indicates whether the data line corresponding with the tag is valid or invalid.

Support circuitry, typically associated with the cache, receives the status indicator and the tag. When the status indicator indicates invalid data, then the support circuitry forwards a "miss" indication to the processor, in which case the processor must access the main memory for the data line. When the status indicator indicates valid data, the support circuitry compares the tag with the remainder of the address in order to determine if the cache is currently storing the desired data line. When the cache does not have the data line being requested as determined by the tag comparison, then the support circuitry forwards a "miss" indication to the processor, in which case the processor must access the main memory for the data line. When the cache does have the data line being requested as determined by the tag comparison, then the support circuitry forwards a "hit" indication to the processor, which prompts the processor to read the requested data line.

In processors that perform out of order execution of instructions or superscalar execution of instructions, more than one instruction may seek the same data line. Further, if the data line is not available in the cache, then multiple memory requests to the main memory can be generated and communicated on the system interface, or bus(es). This predicament is undesirable as it reduces the bandwidth of the system interface by increasing traffic.

SUMMARY OF THE INVENTION

An object of the present invention is to overcome the inadequacies and deficiencies of the prior art as discussed above in the background section.

Another object of the present invention is to improve the performance of processors that execute instructions out of order.

Another object of the present invention is to provide a miss tracking system and method for minimizing memory requests to main memory in the event of a cache miss in an out of order processing system.

Another object of the present invention is to provide a miss tracking system and method for eliminating redundant memory requests and updating instructions that are dependent upon the memory requests once data lines are returned from main memory in an out of order processing system.

Another object of the present invention is to provide a miss tracking system and method that is simple in design, efficient and reliable in operation, and capable of inexpensive production on a mass scale.

Briefly described, the present invention provides a miss tracking system and method that optimizes the bandwidth to a main memory that is associated with a processing system that utilizes a data cache and that executes instructions out of order. The miss tracking system includes a processor, a main memory in communication with the processor via a system interface, and a data cache (DCACHE) associated with the processor.

The processor has an instruction reordering mechanism, preferably but not limited to, a memory queue (MQUEUE), for receiving and executing instructions that are directed to memory accesses, i.e., loads or stores to the main memory or the DCACHE. The MQUEUE includes a plurality of instruction processing mechanisms for receiving respective memory instructions. Each instruction processing mechanism includes an instruction register for storing the corresponding instruction and an address reorder buffer slots (ARBSLOTs) for receiving the data address of the results pertaining to the instruction execution. The instruction processing mechanisms launch instructions (for commencing execution) out of order, and the instructions cause accesses to be made to the DCACHE.

In accordance with a significant feature of the invention, dependent-on-miss (DM) indicator logic associated with each of the instruction processing mechanism, particularly the ARBSLOTs, prevents a request from its respective ARBSLOT to the main memory for miss data that is absent from the DCACHE when another ARBSLOT has already requested from the main memory the miss data. The DM indicator logic includes a DM indicator, for example, a latch or other suitable mechanism, configured to assert and deassert a signal DM for indicating respectively whether or not an instruction associated with its respective ARBSLOT currently depends upon miss data that has not yet been received. The DM indicator logic asserts the signal DM when a cache miss occurs, but will prevent any request from its respective ARBSLOT to the main memory for the miss data when another ARBSLOT has already made the request. The DM indicator deasserts the signal DM when the miss data is received from the main memory by the DCACHE, which deassertion causes the particular ARBSLOT to access the DCACHE once again for the data.

Furthermore, a status indicator, which is one or more bits in the preferred embodiment, is associated with each cache data line. The status indicator can indicate a "miss pending" status, when appropriate, which means that the corresponding cache data line is both invalid and has already been requested from the main memory. The logic examines the status indicator during a cache access. When the status indicator indicates the miss pending status, the logic asserts the signal DM with the DM indicator and refrains from initiating an access to the main memory.

For the purpose of achieving higher performance, the status indicator can also indicate a "cache line half valid" status when only half of a data line is valid. In the preferred embodiment, cache lines are returned from the main memory in two halves. This additional status information allows the logic to recognize when half of the cache line is available and whether the data address in a given ARBSLOT can go ahead and access its data from the half line that is in the DCACHE.

The invention can also be viewed as providing a novel method for preserving bandwidth to a main memory that is associated with a processing system that utilizes a data cache and that executes instructions out of order. In this regard, the method can be broadly conceptualized as follows: executing instructions directed to data accesses out of order; accessing the data cache with the processing system pursuant to the instructions; recognizing miss data that is absent from the data cache with the processing system; and preventing a plurality of requests to the main memory for the miss data.

Other objects, features, and advantages of the present invention will become apparent to one of skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. In the drawings, the schematic illustrations of the various components therein are not necessarily to scale, emphasis instead being placed upon clearly illustrating principles of the invention. Furthermore, like reference numerals designate corresponding parts throughout the several views.

DETAILED DESCRIPTION OF THE PREFERRED EMBODIMENT

Figure 1:
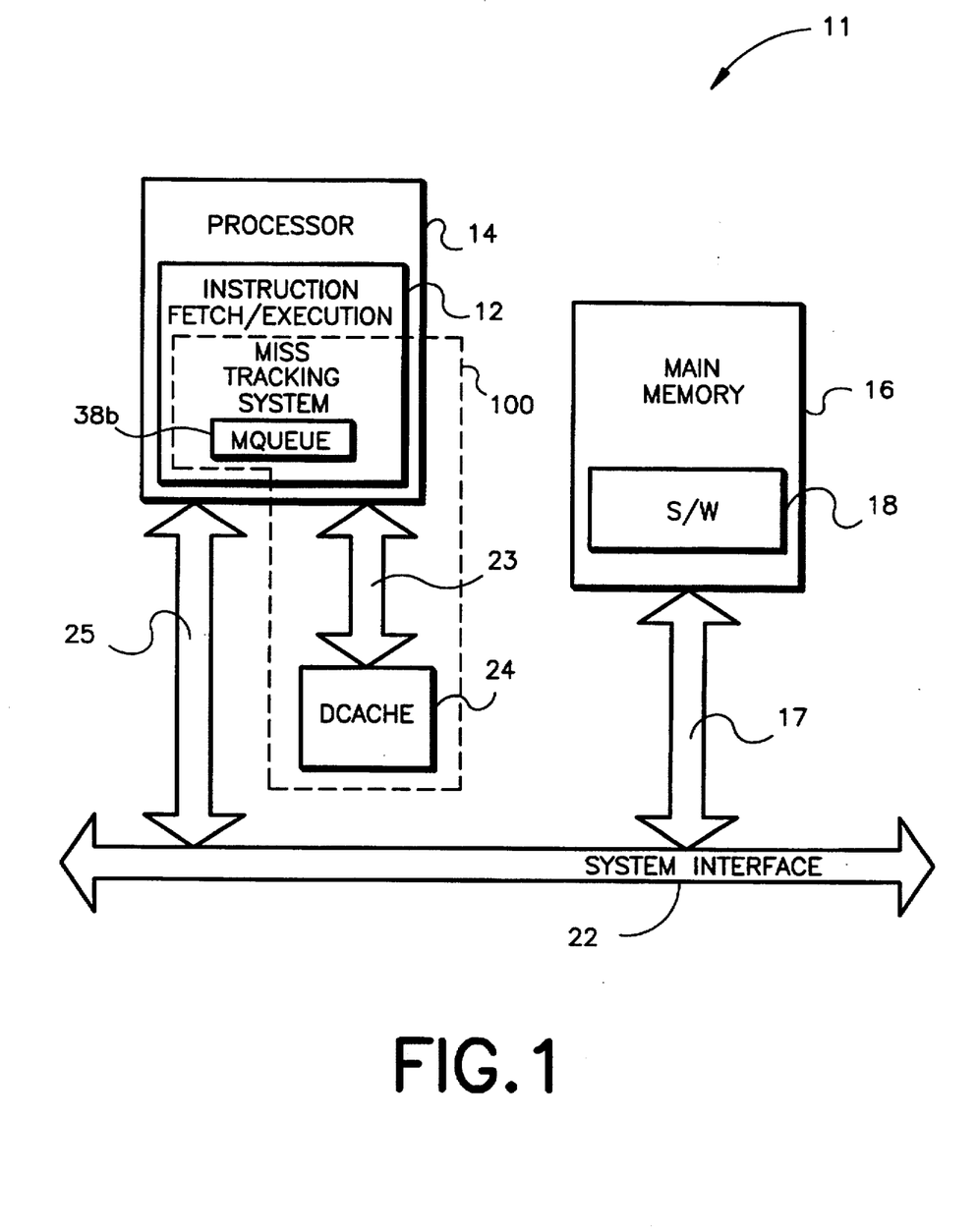
FIG. 1 is a block diagram showing a computer implementing the miss tracking system and method of the present invention.

As shown in FIG. 1, the miss tracking system 100 (see FIGS. 3 and 4 for more details) and associated methodology of the present invention is implemented within a computer 11, and particularly, in connection with a memory queue (MQUEUE) within an instruction fetch/execution system 12 of a processor 14 and in connection with a data cache (DCACHE) 24 connected to the processor 14 of the computer 11. The computer 11 generally comprises the processor 14, a main memory 16 having software (S/W) 18 for driving the processor 14, the DCACHE 24 interconnected with the processor 14 as indicated by reference arrow 23, and a system interface 22, such as one or more buses, interconnecting the processor 14 and the main memory 16. In operation, as the instruction fetch/execution system 12 in the processor 14 executes the software 18, data that is in current use in the processor 14 is moved into the DCACHE 24, thereby reducing the average access time for the processor's memory requests and minimizing traffic on the system interface 22. Finally, it should be mentioned that, with the exception of the novel miss tracking system 100, all of the aforementioned computer components and their interactions are well known and understood in the art.

A typical cache line in the DCACHE 24 includes a tag, a status indicator, and data. A cache index is forwarded to the DCACHE 24 and is used by the DCACHE 24 to select a storage location(s) that may contain the desired data line. In response to receipt of a cache index, the DCACHE 24 outputs a tag, which is a real page number (RPN) in the preferred embodiment, corresponding with the location(s), a status indicator, which indicates whether the data line corresponding with the tag is valid or invalid, and data, which may be valid or invalid. Typically, the status indicator indicates the following states: "invalid," which means that no data is present; "valid shared," which means that data is present, but may be also located elsewhere; "valid private clean," which means that the line has the sole copy and the DCACHE 24 has not yet written to the line; and "valid private dirty," which means that the line has the sole copy and that the DCACHE 24 has written to the line (and thus needs to copy the line to main memory 16.

A tag compare mechanism 108 (FIG. 3) associated with the DCACHE 24, receives the status indicator and the tag. When the status indicator indicates invalid data, then the tag compare mechanism forwards a "miss" indication to the processor 14, in which case the processor 14 accesses the main memory 16 for the data line. When the status indicator indicates valid data, the tag compare mechanism compares the tag with the remainder of the address in order to determine if the DCACHE 24 is currently storing the desired data line. When the DCACHE 24 does not have the data line being requested as determined by the tag comparison, then the tag compare mechanism forwards a "miss" indication to the processor 14, in which case the processor 14 accesses the main memory 16 for the data line. When the DCACHE 24 does have the data line being requested as determined by the tag comparison, then the tag compare mechanism forwards a "hit" indication to the processor 14, which prompts the processor 14 to read the requested data line.

Figure 2:
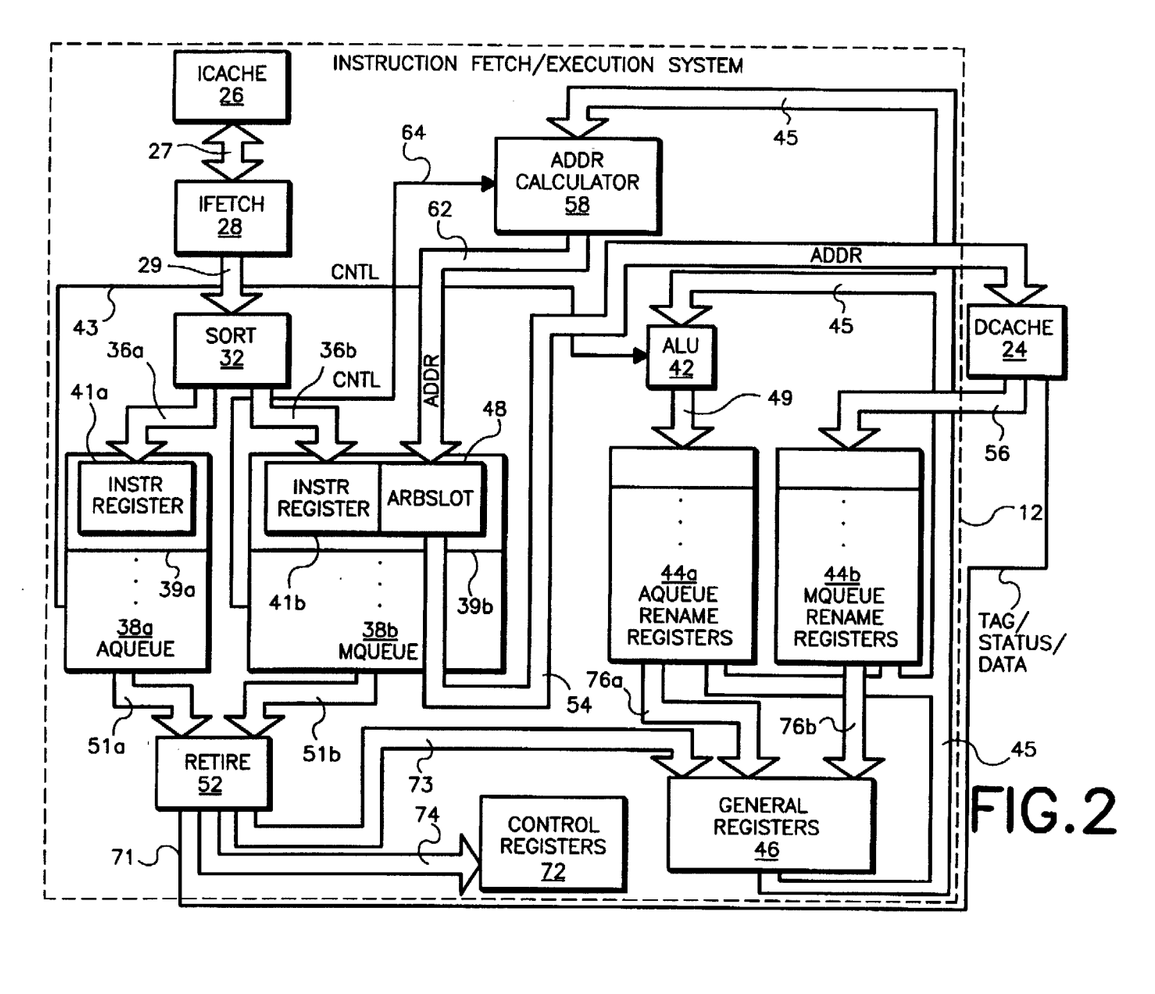
FIG. 2 is a block diagram showing a possible implementation of an instruction fetch/execution system in a processor of FIG. 1.

A possible implementation of the instruction fetch/ execution system 12 is illustrated by way of block diagram in FIG. 2. As shown in FIG. 2, the instruction fetch/ execution system 12 has an instruction cache (ICACHE) 26 for storing instructions from the software 18 (FIG. 1). An instruction fetch mechanism (IFETCH) 28 communicates with the ICACHE 26 and retrieves instructions from the ICACHE 26 for ultimate execution. In the preferred embodiment, the IFETCH 28 fetches four instructions (each 32 bits) at a time and transfers the instructions to a sort mechanism 32.

The sort mechanism 32 determines whether each instruction is destined for an arithmetic logic unit (ALU) or the memory and distributes the instructions accordingly into an arithmetic logic unit queue (AQUEUE) 38a and the MQUEUE 38b, respectively, as indicated by corresponding reference arrows 36a, 36b.

The arithmetic logic unit queue 38a contains ALU instruction processing mechanisms 39a (in the preferred embodiment, there are 28 in number) that have registers 41a for storing respective instructions that are directed to an arithmetic logic unit 42, as indicated by reference arrow 43. The instructions in the arithmetic logic unit queue 38a are executed in any order possible (preferably, in data flow fashion), and as they complete, the results are captured and marked complete.

The ALU 42, under the control of the queue 38a, can retrieve operands from rename registers 44a, 44b and general registers 46, as is indicated by interface 45. After the ALU 42 operates on the operands, the results of the operation are stored in the AQUEUE rename registers 44a, as delineated by reference arrow 49.

The memory queue 38b contains instruction processing mechanisms 39b. Each instruction processing mechanism 39b includes a register 41b for storing a respective memory instruction and includes an address reorder buffer slot (ARBSLOT; in the preferred embodiment, there are 28 in number), denoted by reference numeral 48, for storing a respective address. Memory instructions in the memory queue 38b can be classified as "loads" and "stores" to memory. A "load" is a request to transfer data from memory (cache or main memory) to a register, whereas a "store" is a request to transfer data from a register to memory.

During execution of an instruction, a first phase involves executing a prescribed mathematical operation on operands in order to compute an address, and a second phase involves accessing the memory/cache for data based upon the calculated address. The MQUEUE 38b executes each of the instructions and the two phases (address computation and memory/cache access) of execution in any order possible (preferably, in data flow fashion). As the instructions complete, the results are captured by the MQUEUE rename registers 44b and the instruction is marked as complete in the MQUEUE 38b. In the preferred embodiment, the MQUEUE 38b receives up to four instructions (32 bits each) per cycle from the sort mechanism 32 and transfers up to two instructions (32 bits) per cycle to a retire mechanism 52, as indicated by reference arrow 51b.

More specifically, during the first phase of instruction execution, an address is generated by an address calculator 58. The address calculator 58 computes the address based upon operands retrieved from the rename registers 44b and passes the address (real or virtual) to an ARBSLOT 48 corresponding to the instruction in the memory queue 38b, as indicated by reference arrow 62. Control of the calculation by the instruction is indicated by the reference arrow 64 in FIG. 2. When the second phase of memory instruction execution is pursued, the calculated address (including a cache index) is transferred to the DCACHE 24, as indicated by the reference arrow 54, to accomplish a load or a store at the DCACHE 24. In the preferred embodiment, two addresses are transferred each cycle, if possible, from the memory queue 38b to the DCACHE 24. To accommodate this multiple address feature, the DCACHE 24 may be implemented with dual ports, as an example. Alternatively, as another example and as implemented in the preferred embodiment, odd and even addresses are sent concurrently to respective odd and even cache banks in a single-ported random access memory (RAM). The details of the latter design are set forth in a copending application entitled, "Address Aggregation System And Method For Increasing Throughput Of Addresses To A Data Cache From A Processor," filed the same day as the instant application by the same inventor hereof. The foregoing disclosure is incorporated herein by reference as if set forth in full hereinbelow. Once the DCACHE 24 processes the address and hits, the data results are transferred to the rename registers 44b, as indicated by reference arrow 56.

The retire mechanism 52 receives executed instructions (preferably, two 32-bit words per cycle) from each of the queues 38a, 38b, as indicated by corresponding reference arrows 51a, 51b. The retire mechanism 52 commits the instruction results to the architecture state. The software 18 (FIG. 1) is not made aware of any results that are not transformed to the architecture state by the retire mechanism 52. The retire mechanism 52 retires the instructions in the queues 38a, 38b in the program order defined by the software 18 by moving the instruction results to a general register 46 and/or a control register 72, as indicated by respective reference arrows 73, 74, depending upon the instruction's attributes, and causes the results of the instruction to be passed from the rename registers 44a, 44b to the general registers 46, as indicated by the reference arrows 76a, 76b.

When the retire mechanism 52 retires an instruction that resulted in a store to a data line in the DCACHE 24, then the retire mechanism 52 marks the status indicator corresponding with the line as "dirty" to indicate that the line has changed and should ultimately be forwarded to the main memory 16 for updating the line at the main memory 16.

The retire mechanism 52 also has logic for determining whether there is an exception associated with an instruction. An exception is a flag that indicates a special circumstance corresponding with one of the currently retiring instructions. In the event of an exception, the retire mechanism 52 discards all instructions within the queues 38a, 38b that precede the instruction that indicated the exception and causes the IFETCH 28 to retrieve once again the instructions at issue for re-execution or to retrieved special software to handle the special circumstance.

Miss Tracking System and Method

In accordance with a feature of the miss tracking system and method of the present invention, additional cache states are added to the typical states described previously. Specifically, a "miss pending" state and a "cache line half valid" state are added. The foregoing states have been added to enable out of order processing of instructions and multiple concurrent accesses to the DCACHE 24. In the preferred embodiment, the status indicator 82 is implemented with three bits, and the encoding is as indicated in Table A hereafter.

TABLE A

| STATE | BITS |
| --- | --- |
| Invalid | 000 |
| Valid shared | 100 |
| Valid private clean | 110 |
| Valid private dirty | 111 |
| Miss pending | 010 |
| Cache line half valid | 001 (shared line) |
| Cache line half valid | 011 (private line) |

As will be further described in detail later in this document, the "miss pending" state indicates that the corresponding data line is currently not within the DCACHE 24 and is currently being sought after from the main memory 16 (FIG. 1). Moreover, the "cache line half valid" state indicates when only half of a data line has been transferred from the main memory 16 to the DCACHE 24. When there is a data read access, or load, to the DCACHE 24 and the status indicator 82 indicates "cache line half valid," then the requesting instruction determines if the requested data is in the first half or the second half of the line. If it is the first half, then the requesting instruction can execute and mark itself done. In contrast, if it is the second half, then the requesting instruction tries again. The aforementioned feature enhances the performance of the system.

Figure 3:
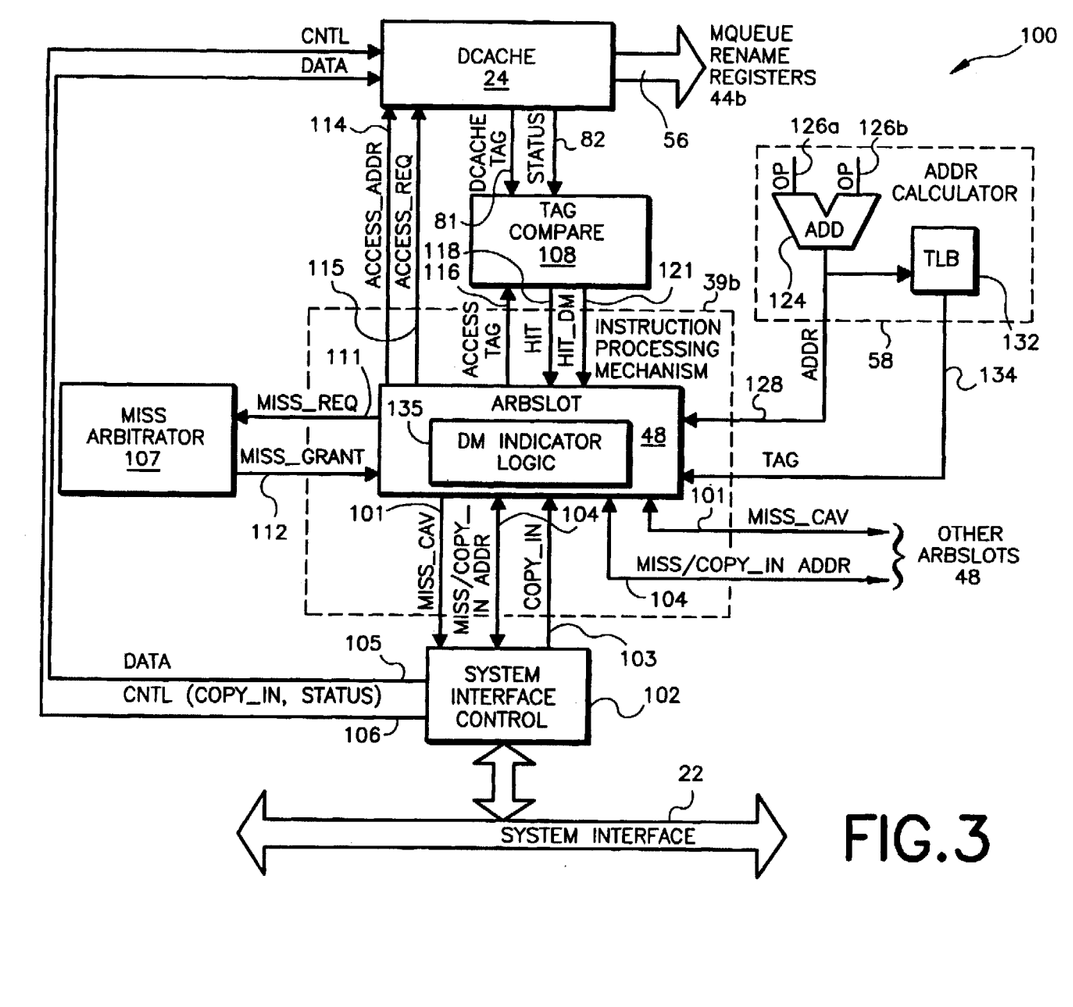
FIG. 3 is a block diagram showing a possible implementation of the novel miss tracking system of FIG. 1.

The miss tracking system 100 of the present invention will now be described with reference to FIGS. 3 and 4. With reference to FIG. 3, the miss tracking system 100 involves the system interface control 102, the plurality of memory instruction processing mechanisms 39b (each of which includes an ARBSLOT 48), the DCACHE 24, a miss arbitrator 107, a tag compare mechanism 108, and the address calculator 58.

The system interface control 102 controls accesses to/from the system interface 22, particularly, requests for data lines to the main memory 16 for data, and transfers data lines 105 and control signals 106 to the DCACHE 24 when data lines are forwarded from the main memory 16. The system interface control 102 receives a miss control signal MISS_CAV 101 and a MISS/COPY_IN ADDR 104 for requesting data from main memory 16 (FIG. 1), both from an ARBSLOT 48. In turn, the system interface control 102 generates and communicates appropriate data request signals to the main memory 16. When the system interface control 102 receives the data line from the main memory 16, then the system interface control 102 communicates the data line 105 to the DCACHE 24 and issues both a control signal COPY_IN 103 and a status indicator "1xx" to the DCACHE 24, as indicated by reference arrow 106. Moreover, the system interface control 102 forwards the address MISS/COPY_IN ADDR 104 corresponding to the line and a control signal COPY_IN 103 to the ARBSLOTs 48, so that the ARBSLOTs 48 are prompted to access the DCACHE 24 for the data line.

Each memory instruction processing mechanism 39b, only one of which is shown in FIG. 3 for simplicity, includes an ARBSLOT 48 interconnected with the DCACHE 24, with the system interface control 102, and with the tag compare mechanism 108. As will be further described in detail later in this document, the ARBSLOT 48 maintains an internal dependent-on-miss (DM) indicator 135 (FIG. 4) for indicating whether or not an instruction associated with its respective ARBSLOT 48 depends upon a miss data line, which has already been requested and which is absent from the DCACHE 24. Moreover, the ARBSLOT 48 includes logic to prevent a request from being made to the main memory 16 from the ARBSLOT 48 for the miss data line when another ARBSLOT 48 has already requested the miss data line from the main memory 16.

Referring to FIG. 3, the ARBSLOT 48 can issue the miss control signal MISS_CAV 101 and can receive the signal from another ARBSLOT 48. The ARBSLOT 48 can also receive the address MISS/COPY_IN ADDR from the system interface control 102 or another ARBSLOT 48. Finally, the ARBSLOT 48 can receive the control signal COPY_IN 103 from the system interface control 102 to advise the ARBSLOT 48 to copy an address that is being forwarded by the system interface control 102.

A miss arbitrator 107 is interconnected with each ARBSLOT 48, as shown in FIG. 3. The miss arbitrator 107 arbitrates access to the system interface 22 among the plurality of ARBSLOTS 48 in the event of cache misses. When it is determined at an ARBSLOT 48 that there is a cache miss, then the ARBSLOT 48 generates a miss request signal MISS_REQ, denoted by reference numeral 111, and transfers the miss request signal MISS_REQ 111 to the miss arbitrator 107. The miss arbitrator 107 prioritizes and selects miss requests from the various ARBSLOTs 48. When the miss arbitrator 107 grants a miss request, it issues a grant signal MISS_GRANT 112 to the selected ARBSLOT 48, which causes the ARBSLOT 48 to issue the miss control signal MISS_CAV 101 and an address MISS/COPY_IN ADDR 104 to the system interface control 102.

The ARBSLOT 48 communicates an address ACCESS_ADDR 114 and an access request signal ACCESS_REQ 115 to the DCACHE 24 in order to retrieve data 56 therefrom. Upon receiving the address ACCESS_ADDR 114 (includes cache index) and the signal ACCESS_REQ 115, the DCACHE 24 generates a DCACHE tag 81 and a status indicator 82, both of which are forwarded to the tag compare mechanism 108.

In addition to receiving the tag 81 and the status indicator 82, the tag compare mechanism 108 receives an access tag ACCESS_TAG 116 from the ARBSLOT 48 and corresponding with the address ACCESS_ADDR 114. The tag compare mechanism 108 examines the status indicator 82 and decodes the same in accordance with Table A set forth previously in this document. When the status indicator 82 indicates that the DCACHE tag 81 is valid, i.e., when the status indicator 82 is "1xx," then the tag compare mechanism 108 also compares the DCACHE tag 81 with the tag ACCESS_TAG 116 in order to determine whether there is a hit or a miss. The tag compare mechanism 108 asserts or deasserts a signal ~HIT 118 to indicate whether there is a miss or hit, respectively, and forwards this signal to the ARBSLOT 48.

The tag compare mechanism 108 asserts a signal HIT_DM when the status indicator 82 indicates that there is a "miss pending", i.e., when the status indicator 82 indicates "010," relative to the cache line that is sought after. When the signal HIT-DM 121 is asserted, the ARBSLOT 48 sets a DM latch to assert a DM variable within the ARBSLOT 48. If the DM variable is asserted in the ARBSLOT 48, then the ARBSLOT 48 will refrain from initiating a data request to the main memory 16 (FIG. 1) for the miss data line.

The address calculator 58 includes an adder 124 for receiving and operating upon operands 126 from the rename registers 44a, 44b and/or the general registers 46 (as shown in FIG. 2). The adder 124 generates a virtual address, which is passed to the ARBSLOT 48 and a translation lookaside buffer (TLB) 132. The TLB 132 generates a real address tag 134 based upon the virtual address 128 and passes the real address tag 134 to the ARBSLOT 48. The tag 134 is ultimately passed to the tag compare mechanism 108 as the tag ACCESS_TAG 116.

Figure 4:
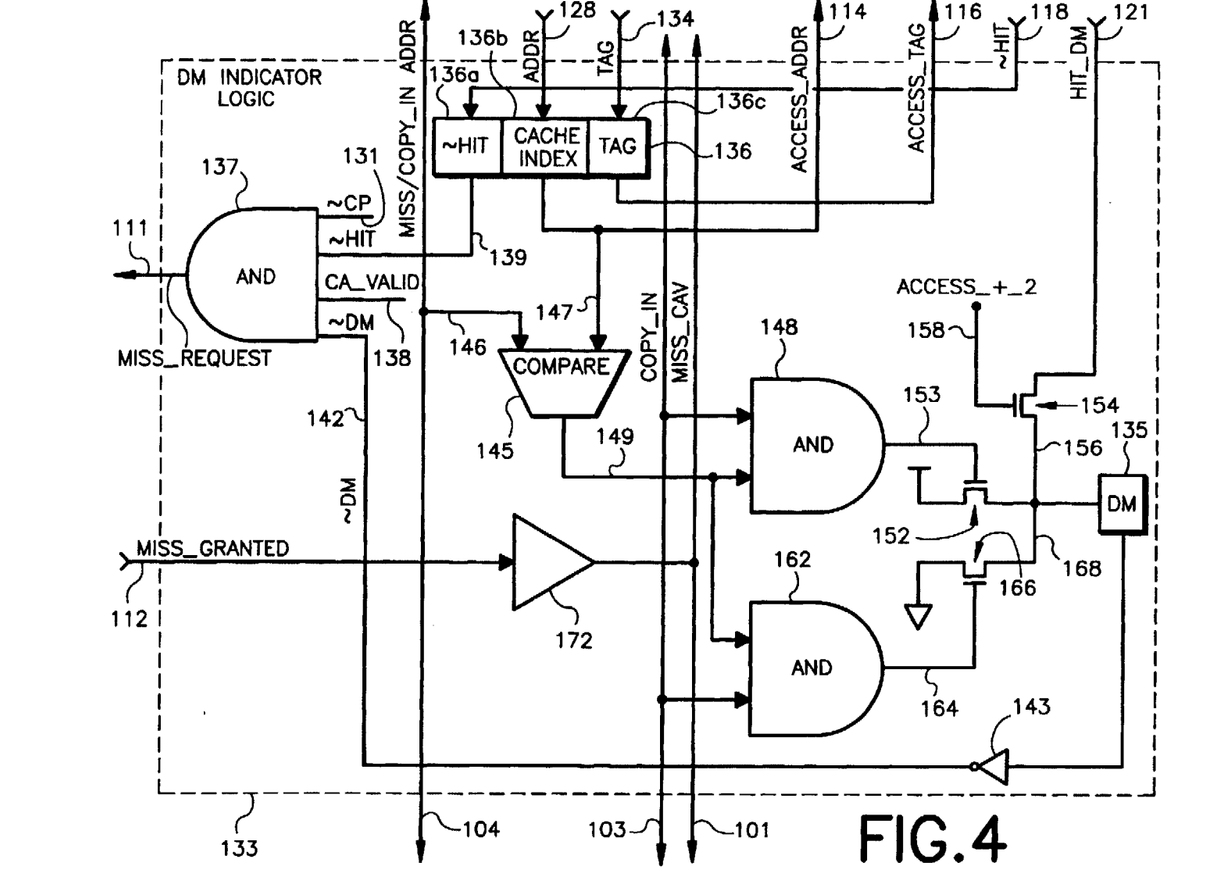
FIG. 4 is a block diagram showing a possible implementation of dependent-on-miss (DM) indicator logic that tracks cache misses in each address reorder buffer slot (ARBSLOT) of FIG. 4.

Dependent-on-miss (DM) indicator logic 133, which is situated within each ARBSLOT 48, is shown in detail in FIG. 4. Generally, the DM indicator logic 133 is configured to maintain a dependent-on-miss (DM) indicator 135, for example, a latch or other suitable device, to assert or deassert a signal DM 141 to indicate respectively whether or not the ARBSLOT 48 is dependent on a miss data line. If the ARBSLOT 48 is dependent on a miss data line, then the ARBSLOT 48 will refrain from requesting the data line from the main memory 16. Furthermore, once the miss data line is transferred from the main memory 16 to the ARBSLOT 48 that requested it, the signal DM 141 in each ARBSLOT 48 that requested the miss data line is deasserted by the DM indicator 135, and the ARBSLOTS 48 at issue are permitted to retrieve the desired miss data line from the DCACHE 24.

With reference to FIG. 4, the DM indicator logic 133 includes (a) a register 136 for storing a not hit (~HIT) indicator 136a set by the signal ~HIT 116 from the tag compare mechanism 108, (b) a cache index 136b which is parsed from the address ADDR 128 from the address calculator 58 (FIG. 3) and (c) a real address tag 136c from the TLB 132 (FIG. 3) of the address calculator 58.

The ~HIT indicator 136a is passed to an AND logic gate 137, as indicated by reference arrow 139. The AND logic gate 137 also receives the signal ~DM 142, which is generated by inverting the signal DM 141 from the DM indicator 135 with the inverter 143, a signal ~CP 131 to indicate whether or not the DCACHE 24 has already been accessed by the instruction in the ARBSLOT 48, and a signal CA_VALID 138 to indicate whether or not there is a valid address 104. Based upon the foregoing signals, the AND logic gate 137 generates the miss request signal MISS_REQUEST 111 for the miss arbitrator 107 (FIG. 3). When the signal ~HIT 139 indicates a miss, when the signal ~DM indicates that the ARBSLOT 48 is not dependent upon a miss, when the signal ~CP 131 indicates not cache pending, and when the signal CA_VALID 138 indicates a valid address 104, then the signal MISS_REQUEST 111 is asserted by the AND logic gate 137. Assertion of the signal MISS_REQUEST 111 will ultimately cause a request to be placed to the main memory 16 (FIG. 1) for a missed cache line. Furthermore, when the ~HIT indicator 136a indicates a hit and/or when the signal ~DM 142 indicates that the ARBSLOT 48 is dependent upon a miss, then the AND logic gate 137 will refrain from asserting the miss request signal MISS_REQUEST 111.

A compare mechanism 145 receives a cache index from the address MISS/COPY_IN ADDR, as indicated by reference arrow 146, and compares it to the cache index from the register 136, as indicated by reference arrow 147. The results of the compare mechanism 145 are passed to an AND gate 148, as indicated by reference arrow 149. The compare signal 149 can cause the DM indicator 135 to assert the signal DM 141 based upon the comparison, provided that the miss control signal MISS_CAV is asserted.

In this regard, an AND logic gate 148 receives the compare signal 149 and the miss control signal MISS_CAV, which indicates whether or not a miss request is being made to the main memory 16. The AND logic gate 148 actuates a transistor 152 based upon the states of the compare signal 149 and the miss control signal MISS_CAV 101. When actuation signal 153 is asserted, the transistor 152 causes assertion of the signal DM 141 in the DM indicator 135.

The signal DM 141 can also be asserted by the DM indicator 135 under the control of a transistor 154. The transistor 154 receives the signal HIT_DM 121 from the tag compare mechanism 108, when a miss occurs. Moreover, the system is timed so that the signal HIT_DM 121 should be received after two clock cycles after access to the DCACHE 24 was granted, i.e., after signal ACCESS_REQ 115 was issued. In this regard, the transistor 154 is enabled by a signal ACCESS_+_2, denoted by reference numeral 158, two cycles after the signal ACCESS_REQ 115 (FIG. 3). If the signal HIT_DM 121 is received two cycles after this signal, then the transistor 154 will set the DM indicator 135 to assert the signal DM 141, as indicated by line 156.

An AND logic gate 162 receives the control signal COPY_IN 103 from the system interface control 102 (FIG. 3) and the compare signal 49 from the compare mechanism 145. Based upon these signals, the AND logic gate 162 generates an actuation signal 164 which actuates a transistor 166. The transistor 166, when actuated, causes deassertion of the signal DM 141 by the DM indicator 135, as indicated by connection 168. In general, the signal DM 141 is deasserted when a data line that resulted in the signal DM 141 being asserted is sent from the main memory 16.

The grant signal MISS_GRANTED from the miss arbitrator 107 (FIG. 3) is passed to a driver 172, which drives the miss control signal MISS_CAV. When the miss control signal MISS_CAV is issued, all of the ARBSLOTS 48 are enabled to compare their respective cache indices 136b with the cache index residing on the address MISS/COPY_IN ADDR 104, in order to determine if their respective signals DM 141 should be asserted by their corresponding DM indicators 135.

Operation

The operation of the miss tracking system 100 will now be described with reference to FIGS. 3 and 4.

With reference first to FIG. 3, when an ARBSLOT 48 requests a cache line from the DCACHE 24, the ARBSLOT 48 asserts signal ACCESS_REQ 115 accompanied with an address ACCESS_ADDR 114 (includes a cache index). In the event that there is a potential hit in the DCACHE 24, the status indicator 82 will reflect a valid cache line by an encoding "1xx" (see Table A). Further, the tag compare mechanism 108 reads the tag DCACHE_TAG 81 and compares it to the tag ACCESS_TAG 116 associated with the access address ACCESS_ADDR 114. When there is a match, the tag compare mechanism 108 concludes that there is a hit and deasserts the signal ~HIT 118 to indicate a hit, which causes the ARBSLOT 48 to mark itself done. The result of the operation is held in the rename register until the instruction retires, when it is moved to the architectural register 46.

When the cache access misses based upon a status indicator 82 with an encoding of "0xx", or alternatively, when the tag DCACHE_TAG 81 does not match the tag ACCESS_TAG 116, then the tag compare mechanism 108 asserts the ~HIT signal 118 to indicate a miss to the ARBSLOT 48. Assuming that this is the first ARBSLOT 48 to attempt to access this miss data line, the signal ~DM 142 will be asserted, in which case the AND logic gate 137 will issue the miss request signal MISS_REQUEST 111 to the miss arbitrator 107. The miss arbitrator 107 arbitrates by prioritizing the various miss requests that can be generated by the various ARBSLOTS 48. Eventually, the miss arbitrator 107 issues a signal MISS_GRANTED 112 to grant the miss request. This signal is sent to the driver 172 in the ARBSLOT 48, which in turn asserts the miss control signal MISS_CAV signal 101 to the system interface control 102. The system interface control 102 in turn makes a memory request to the main memory 16 (FIG. 1) for the data line based upon the address MISS/COPY_IN ADDR 104 that is forwarded from the ARBSLOT 48 to the system interface control 102.

Once the data line is transferred from the main memory 16 to the system interface control 102, the system interface control 102 passes the data line to the DCACHE 24, as indicated by reference arrow 105, asserts the control signal COPY_IN to the DCACHE 24, and issues the status bits "1xx" to the DCACHE 24. Simultaneously, the system interface control 102 asserts the control signal COPY_IN 103 to the ARBSLOTs 48 and places the associated address on MISS/COPY_IN ADDR 104 to the ARBSLOTs 48. Each ARBSLOT 48 that needs the data line will have a corresponding asserted signal DM 141, which is deasserted based upon the logic 162, 166. In this regard, the AND logic gate 162 receives an asserted signal 149 from the compare mechanism 145 and an asserted signal COPY_IN. Based upon these signals, the AND logic gate 162 actuates the transistor 166, which in turn deasserts the signal DM 141 maintained by the DM indicator 135.

If another ARBSLOT 148 attempts to access the DCACHE 24 for a miss data line that is currently being requested from main memory 16, then the particular ARBSLOT 48 will be advised by the status indicator 82, as the status indicator 82 will indicate a miss pending status with the encoding of "010", or that the cache line is being requested by another ARBSLOT 48. In this case, the particular ARBSLOT 48 asserts its own signal DM 141 with its DM indicator 135 by asserting the signal HIT_DM 121 from its tag compare mechanism 108. As shown in FIG. 4, assertion of the signal HIT_DM 121 causes the DM indicator 135 to assert the signal DM 141, which precludes the ARBSLOT 48 from making a request to the main memory 16, because the AND logic gate 137 receives a deasserted signal −DM 142.

Many variations and modifications may be made to the preferred embodiment of the invention as described previously. For example, the queues 38a, 38b could be replaced with any instruction reordering mechanism, including a reservation station, which is well known in the art. All such modifications and variations are intended to be included herein within the scope of the present invention, as is defined by the following claims. Finally, in the claims hereafter, the structures, materials, acts, and equivalents of all means-plus-function elements and all step-plus-function elements are intended to include any structures, materials, or acts for performing the specified functions.

Wherefore, the following is claimed:

1. A system for preserving bandwidth to a main memory that is associated with a processing system that utilizes a data cache and that executes instructions out of order, the system comprising:

a processor;

a main memory;

a data cache in communication with said processor, said data cache for receiving and storing data lines from said main memory;

a system interface interconnecting said processor and said main memory;

a plurality of instruction processing mechanisms associated with said processor configured to receive and execute respective instructions out of order and to access said data cache pursuant to said instructions; and logic associated with each of said instruction processing mechanisms, said logic configured to prevent a request from its respective instruction processing mechanism to said main memory for cache miss data when another instruction processing mechanism has already requested from said main memory said miss data that is absent from said data cache.

2. The system of claim 1, wherein said logic further comprises a dependent-on-miss indicator associated with each of said instruction processing mechanisms and connected to said logic, said dependent-on-miss indicator configured to produce a dependent-on-miss signal for indicating when an instruction associated with its respective instruction processing mechanism depends upon said miss data.

3. The system of claim 1, further comprising a status indicator associated with each cache data line maintained by said cache, said status indicator configured to indicate when a corresponding cache data line is both invalid and has already been requested from said main memory.

4. The system of claim 1, further comprising a status indicator associated with each data line maintained by said cache, said status indicator configured to indicate when only half of a corresponding data line is valid.

5. The system of claim 1, further comprising a miss arbitrator connected to said plurality of instruction processing mechanisms, said miss arbitrator for prioritizing requests from said instruction processing mechanisms for respective data lines from said main memory.

6. The system of claim 2, wherein said logic further comprises a means for deasserting said dependent-on-miss indicator when said miss data line is received from said main memory by said data cache.

7. The system of claim 2, further comprising:

a status indicator associated with each cache data line maintained by said data cache, said status indicator configured to indicate a miss pending status when a corresponding cache data line is both invalid and has already been requested from said main memory; and other logic associated with each of said instruction processing mechanisms, said other logic configured to examine said status indicator during a cache access and to assert said dependent-on-miss indicator when said status indicator indicates said miss pending status.

8. The system of claim 3, wherein said logic further comprises:

a tag compare mechanism interconnected with said data cache and configured to receive a data cache tag and said status indicator from said data cache when a cache index is forwarded to said data cache from a respective instruction processing mechanism, said tag compare mechanism configured to compare said data cache tag with another tag corresponding to said cache index in order to assert and deassert, a hit/miss signal when said status indicator indicates that said cache has valid data corresponding to said cache index; and means for combining said hit/miss signal and said dependent-on-miss indicator to derive an arbitration request; and further comprising:

a miss arbitrator connected to said instruction processing mechanisms, said miss arbitrator for prioritizing said arbitration requests from said instruction processing mechanisms and for issuing miss control signals that causes a request for data lines from said main memory.

9. A system for preserving bandwidth to a main memory that is associated with a processing system that utilizes a data cache and that executes instructions out of order, the system comprising:

first means for executing instructions directed to data accesses out of order;

second means for accessing said data cache with said processing system pursuant to said instructions;

third means for recognizing miss data that is absent from said data cache with said processing system; and fourth means for preventing a plurality of requests to said main memory for said miss data.

10. A method for preserving bandwidth to a main memory that is associated with a processing system that utilizes a data cache and that executes instructions out of order, the method comprising the steps of:

executing instructions directed to data accesses out of order;

accessing said data cache with said processing system pursuant to said instructions;

recognizing miss data that is absent from said data cache with said processing system;

preventing a plurality of requests to said main memory for said miss data;

maintaining a plurality of address reorder buffer instruction processing mechanisms associated with said processing system for receiving respective instructions;

maintaining a dependent-on-miss indicator in each said instruction processing mechanism that indicates if an instruction associated with its respective instruction processing mechanism depends upon said miss data; and disabling each of said instruction processing mechanisms from requesting said miss data from said main memory when its corresponding dependent-on-miss indicator is asserted.

11. A method for preserving bandwidth to a main memory that is associated with a processing system that utilizes a data cache and that executes instructions out of order, the method comprising the steps of:

executing instructions directed to data accesses out of order;

accessing said data cache with said processing system pursuant to said instructions;

recognizing miss data that is absent from said data cache with said processing system;

preventing a plurality of requests to said main memory for said miss data;

maintaining a plurality of address reorder buffer instruction processing mechanisms associated with said processing system for receiving respective instructions;

maintaining a dependent-on-miss indicator in each said instruction processing mechanism that indicates if an instruction associated with its respective instruction processing mechanism depends upon said miss data;

disabling each of said instruction processing mechanisms from requesting said miss data from said main memory when its corresponding dependent-on-miss indicator is asserted;

associating a status indicator with each cache data line in said cache for indicating a miss pending status when a corresponding cache data line is both invalid and has already been requested from said main memory;

accessing said cache pursuant to a respective instruction in one of said instruction processing mechanisms and recognizing said miss pending status by examining said status indicator; and asserting said dependent-on-miss indicator in said one instruction processing mechanism.

12. A method for preserving bandwidth to a main memory that is associated with a processing system that utilizes a data cache and that executes instructions out of order, the method comprising the steps of:

executing instructions directed to data accesses out of order;

accessing said data cache with said processing system pursuant to said instructions;

recognizing miss data that is absent from said data cache with said processing system;

preventing a plurality of requests to said main memory for said miss data;

associating a status indicator with each cache data line in said cache for indicating a miss pending status when a corresponding cache data line is both invalid and has already been requested from said main memory;

accessing said cache pursuant to a respective instruction in one of said instruction processing mechanisms and recognizing said miss pending status by examining said status indicator;

asserting said dependent-on-miss indicator in said one instruction processing mechanism;

broadcasting a first cache index to said instruction processing mechanisms;

comparing said first cache index to a second cache index in each of said instruction processing mechanisms; and clearing said dependent-on-miss indicator and reaccessing said cache for data corresponding with said first and second cache indices when a match occurs between said first and second cache indices.

* * * * *